(12) United States Patent
Mayer et al.

(10) Patent No.: US 11,702,972 B2
(45) Date of Patent: Jul. 18, 2023

(54) EXHAUST GAS/REACTANT MIXING ASSEMBLY

(71) Applicant: Purem GmbH, Neunkirchen (DE)

(72) Inventors: Michael Mayer, Bempflingen (DE); Konstantin Kappes, Stuttgart (DE); Tobias Wolf, Koengen (DE); Arthur Wieland, Baltmannsweiler (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/703,636

(22) Filed: Mar. 24, 2022

(65) Prior Publication Data

US 2022/0307403 A1   Sep. 29, 2022

(30) Foreign Application Priority Data

Mar. 25, 2021   (DE) ...................... 10 2021 107 463.0

(51) Int. Cl.
 *F01N 3/20*   (2006.01)
 *F01N 13/10*   (2010.01)
(52) U.S. Cl.
 CPC ......... *F01N 3/2066* (2013.01); *F01N 13/107* (2013.01); *F01N 2240/20* (2013.01); *F01N 2260/14* (2013.01); *F01N 2470/30* (2013.01); *F01N 2610/02* (2013.01)
(58) Field of Classification Search
 CPC .............. F01N 13/107; F01N 2240/20; F01N 2260/14; F01N 2470/30; F01N 2610/02; F01N 3/2066
 See application file for complete search history.

(56) References Cited

U.S. PATENT DOCUMENTS

| 2008/0295495 | A1* | 12/2008 | Amon ................... F01N 3/2066 60/299 |
| 2011/0113759 | A1 | 5/2011 | Tilinski et al. |
| 2011/0146267 | A1* | 6/2011 | Hepburn ............... F01N 3/2066 60/299 |
| 2011/0203262 | A1* | 8/2011 | Potter ................... F01N 3/0821 60/297 |
| 2019/0107026 | A1 | 4/2019 | Gaiser et al. |

FOREIGN PATENT DOCUMENTS

| DE | 10 2006 045 435 A1 | 3/2008 |
| DE | 10 2017 124 541 A1 | 4/2019 |
| EP | 2 325 452 A1 | 5/2011 |
| EP | 3 470 641 A1 | 4/2019 |

* cited by examiner

*Primary Examiner* — Anthony Ayala Delgado

(74) *Attorney, Agent, or Firm* — Walter Ottesen, P.A.

(57) ABSTRACT

An exhaust gas/reactant mixing assembly for an exhaust gas system of an internal combustion engine includes a mixing channel defining a longitudinal axis and extending in the direction thereof. A reactant delivery unit delivers reactant (R) into the mixing channel and an exhaust gas supply channel is arranged upstream of the mixing channel. The exhaust gas supply channel opens into the mixing channel at an opening channel region, wherein the opening channel region has at least two opening channel portions opening into the mixing channel.

14 Claims, 4 Drawing Sheets

EXHAUST GAS/REACTANT MIXING ASSEMBLY

CROSS REFERENCE TO RELATED APPLICATION

This application claims priority of German patent application no. 10 2021 107 463.0, filed Mar. 25, 2021, the entire content of which is incorporated herein by reference.

TECHNICAL FIELD

The present disclosure concerns an exhaust gas/reactant mixing assembly which is used to produce a mixture of exhaust gas and reactant injected into the exhaust gas in an exhaust system of an internal combustion engine, in particular in a vehicle.

BACKGROUND

When reactant, in particular a urea/water solution, is introduced into the exhaust gas expelled by an internal combustion engine, it is important to achieve a thorough mixing of exhaust gas and reactant before the mixture of exhaust gas and reactant is introduced into a catalyst arrangement, for example, an SCR catalyst arrangement.

For this, generally, mixing elements are inserted in the exhaust gas stream downstream of a reactant delivery unit in order to generate turbulence in the exhaust gas stream, which supports the mixing of the exhaust gas and the reactant injected therein. The use of such mixing elements, which, for example, are constructed with guide vanes or similar to generate turbulence, firstly leads to an increased flow resistance and secondly entails the risk of the occurrence of reactant deposits, in particular in fluidic dead spaces.

SUMMARY

It is an object of the present disclosure to provide an exhaust gas/reactant mixing assembly which, with structurally simple configuration, alleviates the risk of the occurrence of deposits.

According to the disclosure, this object is achieved by an exhaust gas/reactant mixing assembly for an exhaust gas system of an internal combustion engine. The exhaust gas/reactant mixing assembly includes:
 a mixing channel extending in the direction of a mixing channel longitudinal axis,
 a reactant delivery unit for delivering reactant into the mixing channel,
 an exhaust gas supply channel upstream of the mixing channel, wherein the exhaust gas supply channel opens into the mixing channel at an opening channel region, wherein the opening channel region has at least two opening channel portions opening into the mixing channel.

By introducing separately or parallel guided exhaust gas streams into the mixing channel via at least two opening channel portions, on merging of the partial exhaust gas streams expelled by the internal combustion engine and flowing through these opening channel portions, in the mixing channel, a turbulence is created without the need for additional mixing elements inserted in the mixing channel. The occurrence of fluidic dead spaces susceptible to the occurrence of deposits in the mixing channel can therefore be avoided.

In order to create a turbulence in the mixing channel as efficiently as possible on merging of the two exhaust gas streams supplied via different inlet channel portions, it is proposed that the mixing channel is formed in a mixing channel housing having a mixing channel housing floor and a mixing channel housing peripheral wall, and that at least one, preferably each opening channel portion is open to the mixing channel in the region of the mixing channel housing peripheral wall and/or in the region of the mixing channel housing floor. In particular, it may be provided that at least two opening channel portions are open to the mixing channel at peripheral regions of the mixing channel housing peripheral wall which lie substantially opposite one another relative to the mixing channel longitudinal axis. Also, an embodiment in which at least two opening channel portions are open to the mixing channel in the same axial region relative to the mixing channel longitudinal axis, supports the creation of a strong turbulence in the mixing channel.

In order to be able to use the entire length of the mixing channel efficiently for mixing of exhaust gas and reactant, the reactant delivery unit may be provided at the mixing channel housing floor, and/or a main reactant delivery direction of the reactant delivery unit may be oriented substantially in the direction of the mixing channel longitudinal axis.

An intensive turbulence in the mixing channel may be further supported if, for at least one, preferably each opening channel portion, a main exhaust gas outflow direction for exhaust gas flowing out of the opening channel portion into the mixing channel has a flow direction component which is substantially tangential relative to the mixing channel longitudinal axis, and/or for at least one, preferably each opening channel portion, a main exhaust gas outflow direction for exhaust gas flowing out of the opening channel portion into the mixing channel lies substantially in a plane orthogonal to the mixing channel longitudinal axis. In this context, it is pointed out that such a main outflow direction may, for example, correspond to the main flow direction in the region of a middle flow path of a respective opening channel portion.

A main exhaust gas inflow direction in the exhaust gas supply channel may be substantially orthogonal to the mixing channel longitudinal axis. Thus a substantially angled structure is achieved which can support integration in other system regions of a vehicle.

In an alternative embodiment, a main exhaust gas inflow direction in the exhaust gas supply channel may be substantially parallel to the mixing channel longitudinal axis. Thus a slender structure is obtained which is elongate in the direction of the mixing channel longitudinal axis.

The exhaust gas supply channel may be formed substantially in an exhaust gas supply channel housing having an exhaust gas supply channel housing floor and an exhaust gas supply channel housing peripheral wall and a plurality of opening line regions starting from the exhaust gas supply channel housing floor and/or from the exhaust gas supply channel housing peripheral wall, wherein an opening channel portion is formed in each opening line region.

Since, in the exhaust gas/reactant mixing assembly constructed according to the disclosure, the efficient mixing of exhaust gas and reactant is achieved by the creation of a turbulence in the exhaust gas by means of flow guidance, there is no need to arrange one or more mixing elements in the mixing channel.

The disclosure furthermore concerns an exhaust gas system for an internal combustion engine including an exhaust gas/reactant mixing assembly structure according to the disclosure.

To convert the reactant in a catalytic reaction, an SCR catalyst arrangement may be provided downstream of the mixing channel.

To further reduce the proportion of contaminants in the exhaust gas, at least one exhaust gas treatment unit may be arranged upstream of the exhaust gas supply channel and/or in the exhaust gas supply channel. Here, the at least one exhaust gas treatment unit may include a catalyst arrangement and/or a particle filter arrangement.

BRIEF DESCRIPTION OF THE DRAWINGS

The invention will now be described with reference to the drawings wherein.

DESCRIPTION OF THE PREFERRED EMBODIMENTS

Figure 1:
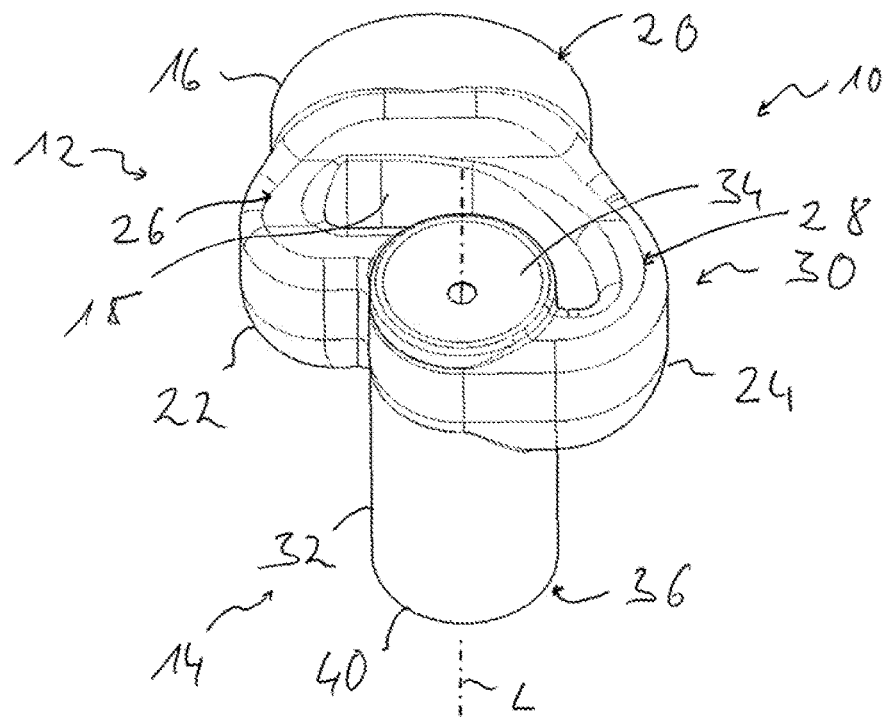
FIG. 1 is a perspective view of an exhaust gas/reactant mixing assembly.
Figure 2:
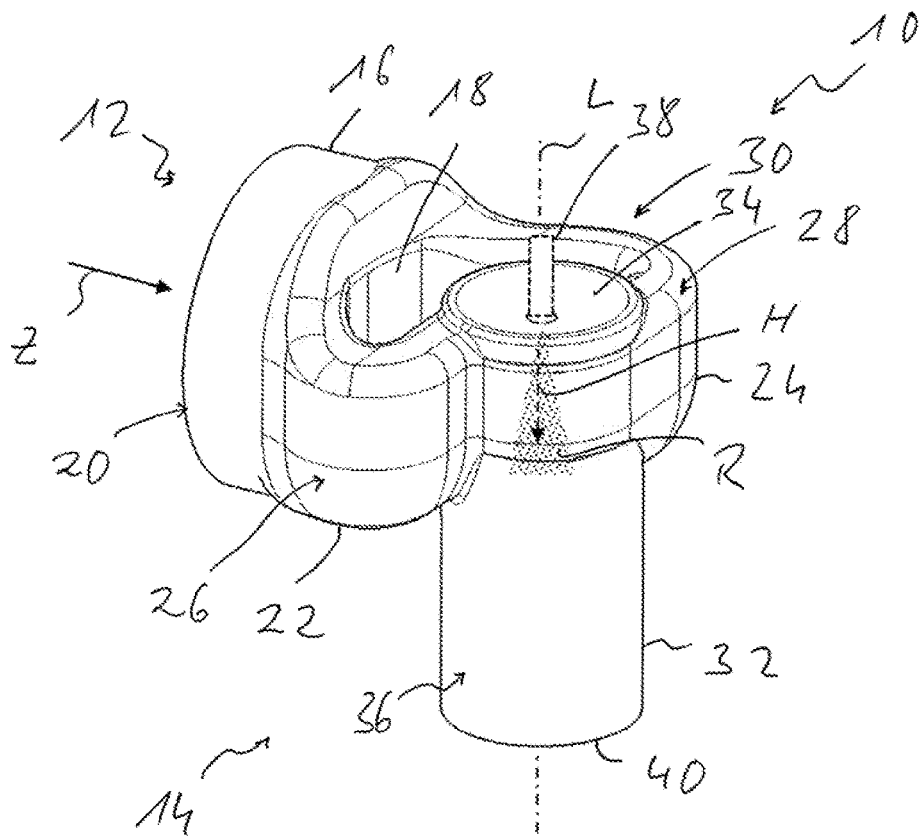
FIG. 2 is another perspective illustration of the exhaust gas/reactant mixing assembly of FIG. 1.
Figure 3:
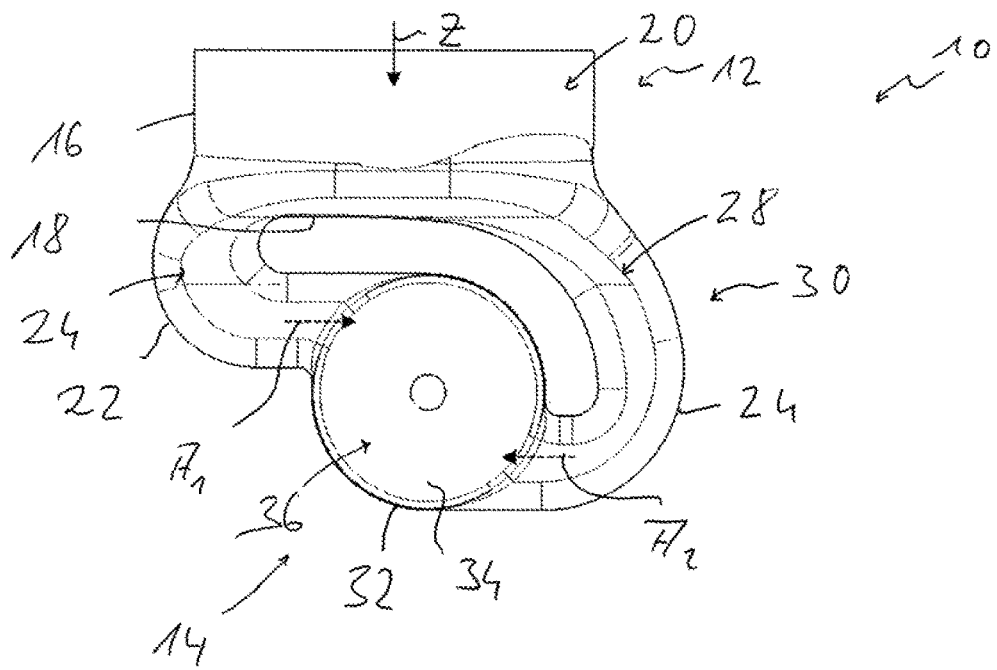
FIG. 3 is a view of the exhaust gas/reactant mixing assembly of FIG. 1, viewed in the direction of a mixing channel longitudinal axis.
Figure 4:
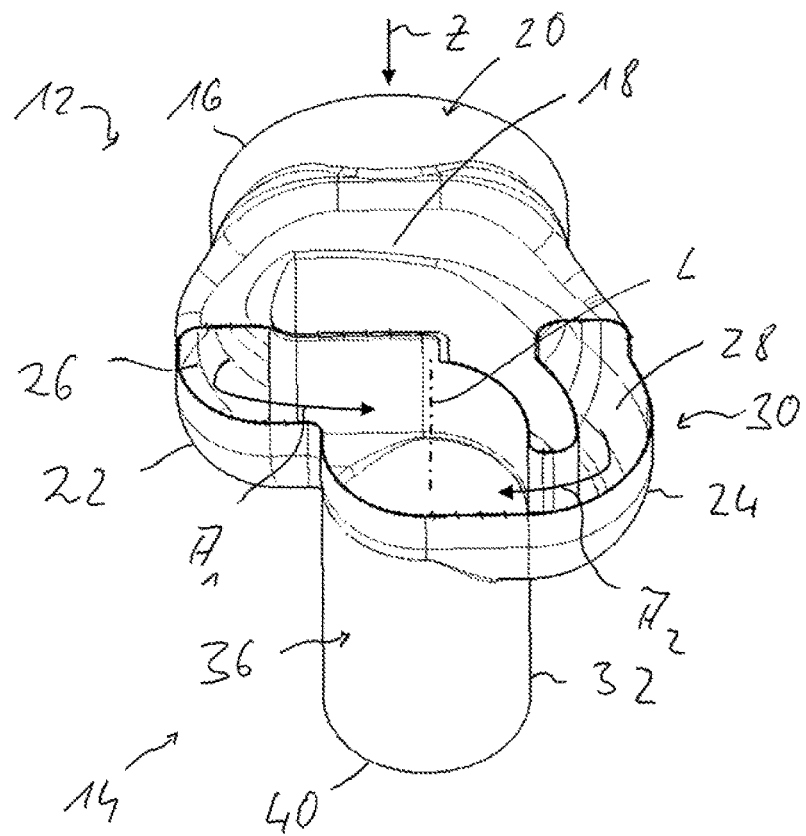
FIG. 4 is a schematic corresponding to FIG. 1, with partially open exhaust gas supply channel housing or mixing channel housing.
Figure 5:
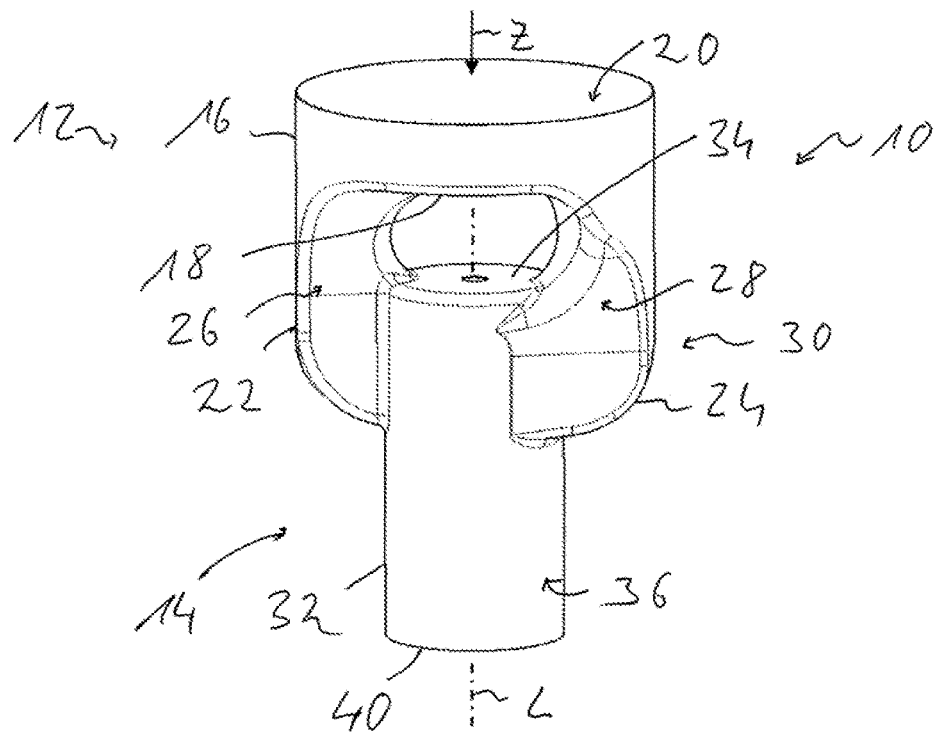
FIG. 5 is a perspective view of another embodiment of an exhaust gas/reactant mixing assembly.
Figure 6:
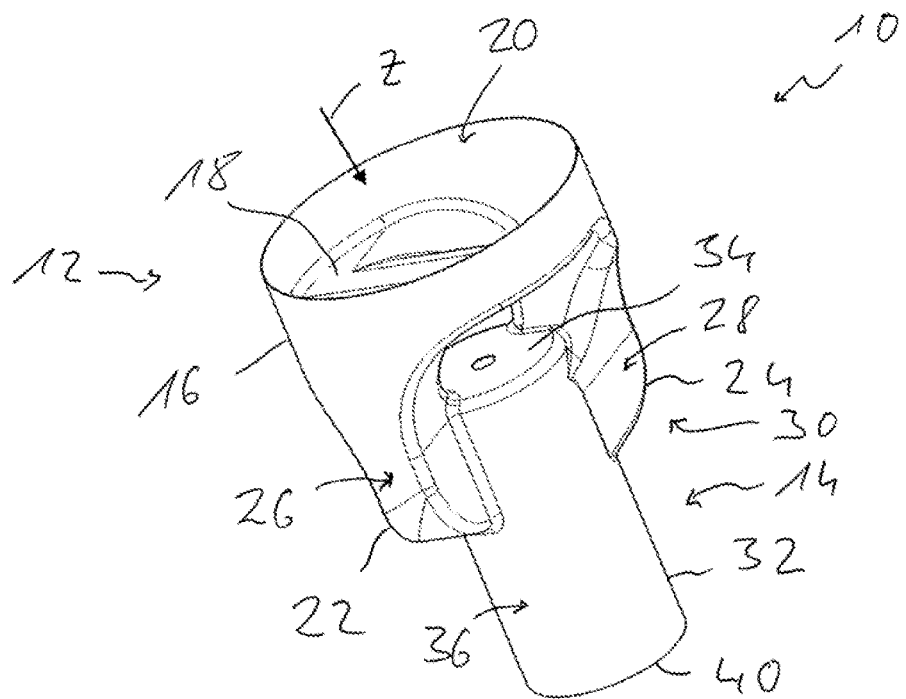
FIG. 6 is another perspective view of the exhaust gas/reactant mixing assembly from FIG. 5.

FIGS. 1 to 4 show a first embodiment of an exhaust gas/reactant mixing assembly 10 in which the exhaust gas expelled by an internal combustion engine is mixed with reactant R injected therein.

The exhaust gas/reactant mixing assembly 10 shown in FIGS. 1 to 4 includes an exhaust gas supply channel housing, generally designated with 12, and connected thereto a mixing channel housing, generally designated with 14. The exhaust gas supply channel housing 12 includes, for example, a substantially cylindrical exhaust gas channel housing peripheral wall 16, and an exhaust gas supply channel housing floor 18 connected to the exhaust gas supply channel housing peripheral wall 16. In an exhaust gas channel, formed in the exhaust gas supply channel housing 12 and generally designated with 20, in particular in the region surrounded by the exhaust gas supply channel housing peripheral wall 16, exhaust gas emitted by an internal combustion engine flows in a main exhaust gas inflow direction Z onto the exhaust gas supply channel housing floor 18.

Two opening line regions 22, 24 start from the exhaust gas supply channel housing floor 18. An opening channel portion 26, 28 of an opening channel region, generally designated with 30, of the exhaust gas supply channel 20 is formed in each of the opening line regions 22, 24.

The mixing channel housing 14 includes, for example, a substantially cylindrical mixing channel housing peripheral wall 32 extending in the direction of the mixing channel longitudinal axis L, and a mixing channel housing floor 34 connected thereto in an axial end region. A substantially rectilinear mixing channel 36 is formed in the mixing channel housing 14.

The two opening line regions 22, 24 of the exhaust gas supply channel housing 12 are connected to the mixing channel housing 14 in the region of the mixing channel housing peripheral wall 32, for example, directly adjacent to the mixing channel housing floor 34. Thus each of the two opening channel portions 26, 28 provided in the opening line regions 22, 24 opens into the mixing channel 36, substantially in the region of the mixing channel housing peripheral wall 32 which surrounds the channel. It is clearly evident in FIG. 3 that the two opening line regions 22, 24 run or connect to the mixing channel housing peripheral wall 32 such that they are offset to one another transversely to the mixing channel longitudinal axis L. As a result, exhaust gas streams emerging from the two opening channel portions 26, 28 have respective main exhaust gas outflow directions $A_1$ and $A_2$ which are similarly offset transversely to the mixing channel longitudinal axis L, or run substantially tangentially thereto, or have a flow direction component oriented substantially tangentially relative to the mixing channel longitudinal axis L.

It is pointed out that such a main exhaust gas outflow direction $A_1$ or $A_2$ may correspond approximately to the main flow direction or be defined by a main outflow direction of an exhaust gas stream, flowing through a respective opening channel portion 26 or 28, in the region of the middle flow path of a respective opening channel portion 26 or 28. This means that such a main exhaust gas outflow direction $A_1$ or $A_2$ may also correspond substantially to the course of a respective middle flow path in the region of the opening of a respective opening channel portion 26, 28 into the mixing channel 36. Since, in the axial direction of the mixing channel longitudinal axis L, the opening channel portions 26, 28 connect to the mixing channel housing peripheral wall 32 substantially in the same region, the two main exhaust gas outflow directions $A_1$, $A_2$—or the middle flow paths, for example, defining these by their course—also lie in a plane substantially orthogonal to the mixing channel longitudinal axis L and defined, for example, by the drawing plane in FIG. 3.

A reactant delivery unit 38, generally also known as an injector, is provided on the mixing channel housing floor 34, for example, centrally to the mixing channel longitudinal axis L. This delivers the reactant R, for example, in the form of a spray cone, into the mixing channel 36 in a main reactant delivery direction H along the mixing channel longitudinal axis L. Because the two opening channel portions 26, 28 are open to the mixing channel 36 at regions of the mixing channel housing peripheral wall 32 which lie substantially diametrically opposite one another relative to the mixing channel longitudinal axis L, and because the main exhaust gas outflow directions $A_1$ or $A_2$ with their tangentially oriented flow direction components are offset to one another transversely to the mixing channel longitudinal axis L, the exhaust gas streams, which are introduced into the mixing channel 36 via the two opening channel portions 26, 28 in the region of the inlet of the reactant R, create an eddy or swirling in the mixing channel 36 which picks up the reactant R injected into the mixing channel 36 and, following the direction of the swirling flow, leads along the inside of the mixing channel housing peripheral wall 32 and, in the direction of the mixing channel longitudinal axis L, away from the mixing channel housing floor 34 to an output opening 40 of the mixing channel 36.

Because of this turbulence created in the mixing channel 36, an efficient mixing of exhaust gas and reactant R and hence an efficient vaporization of the reactant R is achieved; this is supported in particular in that, because of this swirling, the reactant R covers a significantly longer flow path in the mixing channel 36 than would be the case if the exhaust gas (and hence the reactant R) were to flow substantially in the direction of the mixing channel longitudinal axis L. Thus the retention time of the reactant R in the mixing channel 36, and hence also the time in which this can vaporize and mix with the exhaust gas, is extended.

Since, with the structure of an exhaust gas/reactant mixing assembly shown in FIGS. 1 to 4, an efficient mixing of exhaust gas and reactant R is achieved solely by the flow guidance of the exhaust gas supplied to the mixing channel 36, it is not necessary to provide any mixing elements in the mixing channel 36 downstream of the introduction of reactant R, in order to create turbulence by flow deflection. The risk of creating fluidic dead spaces, in which deposits of reactant R preferably occur, by the incorporation of such mixing elements is therefore completely eliminated with such a configuration of an exhaust gas/reactant mixing assembly 10. This is a significant advantage also when using, for example, a urea/water solution as such a reactant, in which above all the urea has a strong tendency to form crystalline deposits. Also, the absence of such mixing elements in the mixing channel 36 avoids a resulting increased flow resistance, which in principle already contributes to reduced pollutant emissions from an internal combustion engine and evidently also supports a simply structured overall configuration.

FIGS. 1 to 4 show that, at the transition from the exhaust gas supply channel 20 to the mixing channel 36, a basic flow deflection of around 90° takes place, since the main exhaust gas inflow direction Z in the exhaust gas supply channel 20 is oriented approximately orthogonally to the mixing channel longitudinal axis L. The exhaust gas/reactant mixing assembly 10 thus has a substantially angled structure.

FIGS. 5 to 8 show an alternative embodiment in particular with respect to this aspect. Components or system regions which correspond to the components or system regions previously described with reference to FIGS. 1 to 4, carry the same reference signs.

With the structure of an exhaust gas/reactant mixing assembly 10 shown in FIGS. 5 to 8, the exhaust gas supply channel housing 12 is arranged substantially in the axial extension of the mixing channel housing 14, so that, for example, the exhaust gas supply channel housing peripheral wall 16 is positioned substantially coaxially to the mixing channel peripheral wall 32. The opening line regions 22, 24, starting substantially from the exhaust gas supply channel housing floor 18, extend substantially in the direction of the mixing channel longitudinal axis L away from the exhaust gas supply channel housing floor 18 towards the mixing channel housing 14, and, in radially inwardly guided end regions, connect to the mixing channel housing peripheral wall 32 at regions which are substantially diametrically opposed to one another relative to the mixing channel longitudinal axis L. In this embodiment too, the exhaust gas, which is conducted through the opening channel portions 26, 28 formed in the opening line regions 22, 24, flows in the direction towards the mixing channel 36 in the respective main exhaust gas outflow directions A1, A2 which are laterally offset to one another relative to the mixing channel longitudinal axis L or oriented substantially tangentially thereto and opposite one another. In this embodiment too, the exhaust gas streams flowing through the two opening channel portions are conducted into the mixing channel 36 in substantially the same axial region, so that a swirling flow is efficiently created which carries the reactant introduced into the mixing channel 36 in the main reactant delivery direction H, and leads to the above-described mixing effect.

Figure 7:
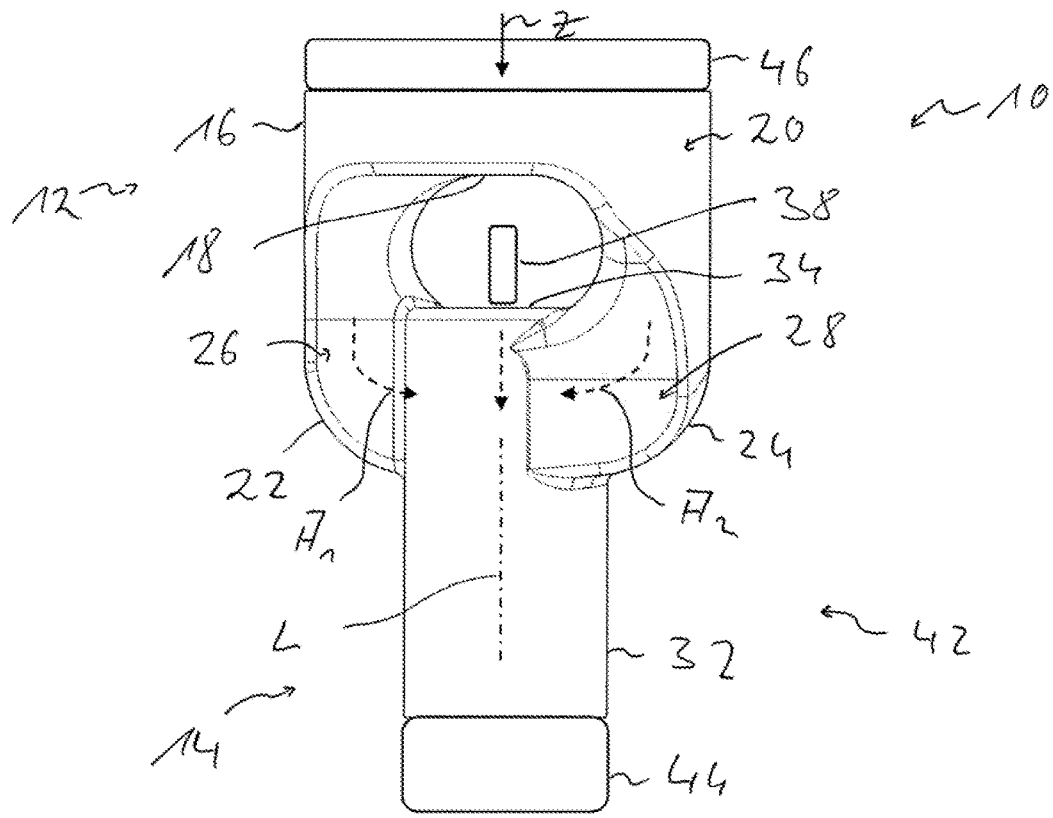
FIG. 7 is a side view of the exhaust gas/reactant mixing assembly of FIG. 5 combined with other system regions of an exhaust gas system; and, FIG. 8 is a view of the exhaust gas/reactant mixing assembly of FIG. 5, viewed in the direction of a mixing channel longitudinal axis.
Figure 8:
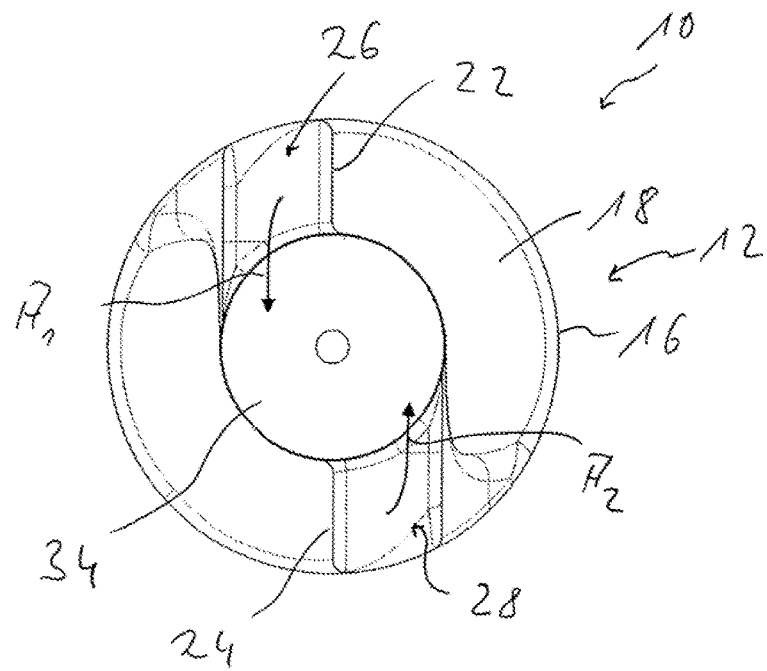

FIG. 7 illustrates in general the integration of such an exhaust gas/reactant mixing assembly 10 in an exhaust gas system, generally designated with 42. This includes, downstream of the mixing channel 36 or mixing channel housing 14, an SCR catalyst arrangement 44 in which the nitrogen oxide proportion in the exhaust gas is reduced by conversion of the reactant. The exhaust gas system 42 may furthermore include one or more exhaust gas treatment units 46 upstream relative to the exhaust gas/reactant mixing assembly 10. Such an exhaust gas treatment unit 46 may, for example, be configured as a catalyst arrangement, in particular a diesel oxidation catalyst arrangement. It is also possible to integrate an exhaust gas treatment unit 46 formed as a particle filter arrangement in such an exhaust gas system 42 upstream of the exhaust gas/reactant mixing assembly 10. In principle, such an exhaust gas treatment unit 46 may also be inserted or positioned so as to engage in the exhaust gas supply channel housing 12, in particular the volume region surrounded by the exhaust gas supply channel housing peripheral wall 16.

Although the introduction of the opening channel portions 26, 28 in the mixing channel 36 in the region of the mixing channel housing peripheral wall 32 shown in the figures is particularly advantageous, because of the particularly efficient generation of a swirling flow owing to the comparatively large radial distance from the mixing channel longitudinal axis L, for a radially slender configuration it may be advantageous for the opening line regions 22, 24 providing the opening channel portions 26, 28 to connect to the mixing channel housing 14, alternatively or additionally, in the region of the mixing channel housing floor 34. The or a part of the exhaust gas emerging from the respective opening channel portions 26, 28 then enters the mixing channel 36 in the region of the mixing channel housing floor 34, that is, closer to the mixing channel longitudinal axis L in the mixing channel 36.

It is understood that the foregoing description is that of the preferred embodiments of the invention and that various changes and modifications may be made thereto without departing from the spirit and scope of the invention as defined in the appended claims.

What is claimed is:
1. An exhaust gas/reactant mixing assembly for an exhaust gas system of an internal combustion engine, the exhaust gas/reactant mixing assembly comprising:
   a mixing channel defining a longitudinal axis (L) and being configured to extend along said longitudinal axis (L);
   an exhaust gas supply channel arranged upstream of said mixing channel;
   a junction region whereat said exhaust gas supply channel opens into said mixing channel;
   said junction region including at least two junction channel sections opening into said mixture channel to conduct a flow of exhaust gas from said exhaust gas supply channel into said mixture channel;
   a reactant delivery unit for delivering reactant (R) into said mixing channel;

a mixing channel housing having a mixing channel housing base and a mixing channel housing peripheral wall, said mixing channel being formed in said mixing channel housing, said at least two junction channel sections being open to said mixing channel in the region of said mixing channel housing peripheral wall at peripheral regions of said mixing channel housing peripheral wall lying opposite one another relative to said mixing channel longitudinal axis (L); and, wherein main exhaust gas outflow directions ($A_1$, $A_2$) for exhaust gas flowing out of said at least two junction channel sections into the mixing channel lie substantially in a plane orthogonal to said longitudinal axis (L) and have a flow direction component that is substantially tangential relative to said longitudinal axis (L).

2. The exhaust gas/reactant mixing assembly of claim 1, wherein at least one of said junction channel sections is open to said mixing channel in the region of said mixing channel housing base.

3. The exhaust gas/reactant mixing assembly of claim 1, wherein said at least two junction channel sections are open to said mixing channel in the same axial region relative to said longitudinal axis (L).

4. The exhaust gas/reactant mixing assembly of claim 1, wherein at least one of the following applies:
 a) said reactant delivery unit is arranged at said mixing channel housing base; and,
 b) said reactant delivery unit defines a main reactant delivery direction (H) which is oriented substantially in the direction of said longitudinal axis (L).

5. The exhaust gas/reactant mixing assembly of claim 1, wherein said exhaust gas/reactant mixing assembly is configured to cause said main exhaust gas inflow to have a direction (Z) in said exhaust gas supply channel which is substantially orthogonal to said longitudinal axis (L) of said mixing channel.

6. The exhaust gas/reactant mixing assembly of claim 1, wherein said exhaust gas/reactant mixing assembly is configured to cause said main exhaust gas inflow to have a direction (Z) in said exhaust gas supply channel which is substantially parallel to said longitudinal axis (L) of said mixing channel.

7. The exhaust gas/reactant mixing assembly of claim 1, further comprising:
 an exhaust gas supply channel housing having an exhaust gas supply channel housing base and an exhaust gas supply channel housing peripheral wall;
 said exhaust gas supply channel being formed substantially in said exhaust gas supply channel housing;
 said exhaust gas supply channel housing further having a plurality of opening line regions starting from at least one of:
  a) said exhaust gas supply channel housing base; and,
  b) said exhaust gas supply channel housing peripheral wall; and, said junction channel sections being configured in corresponding ones of said opening line regions.

8. The exhaust gas/reactant mixing assembly of claim 1, wherein said mixing channel is devoid of a mixing element.

9. The exhaust gas/reactant mixing assembly of claim 1, wherein the tangentially oriented flow direction components of said main exhaust gas outflow directions ($A_1$, $A_2$) are offset to one another transversely to the mixing channel longitudinal axis and are oriented in opposite directions.

10. An exhaust gas system for an internal combustion engine, the exhaust gas system comprising:
 an exhaust gas/reactant mixing assembly including:
 a mixing channel defining a longitudinal axis (L) and being configured to extend along said longitudinal axis (L);
 an exhaust gas supply channel arranged upstream of said mixing channel;
 a junction region whereat said exhaust gas supply channel opens into said mixing channel;
 said junction region including at least two junction channel sections opening into said mixture channel to conduct a flow of exhaust gas from said exhaust gas channel into said mixture channel;
 a reactant delivery unit for delivering reactant (R) into said mixing channel;
 a mixing channel housing having a mixing channel housing base and a mixing channel housing peripheral wall, said mixing channel being formed in said mixing channel housing, said at least two junction channel sections being open to said mixing channel in the region of said mixing channel housing peripheral wall at peripheral regions of said mixing channel housing peripheral wall lying opposite one another relative to said mixing channel longitudinal axis (L); and,
 wherein main exhaust gas outflow directions ($A_1$, $A_2$) for exhaust gas flowing out of said at least two junction channel sections into the mixing channel lie substantially in a plane orthogonal to said longitudinal axis (L) and have a flow direction component that is substantially tangential relative to said longitudinal axis (L).

11. The exhaust gas system of claim 10, wherein an SCR catalyst arrangement is provided downstream of said mixing channel.

12. The exhaust gas system of claim 10, wherein at least one exhaust gas treatment unit is arranged at least at one of the following locations: a) upstream of the exhaust gas supply channel; and, b) in the exhaust gas supply channel.

13. The exhaust gas system of claim 12, wherein the at least one exhaust gas treatment unit includes at least one of a catalyst arrangement and a particle filter arrangement.

14. The exhaust gas system of claim 10, wherein the tangentially oriented flow direction components of said main exhaust gas outflow directions ($A_1$, $A_2$) are offset to one another transversely to the mixing channel longitudinal axis and are oriented in opposite directions.

* * * * *